United States Patent
Laethem

(10) Patent No.: US 11,520,761 B2
(45) Date of Patent: Dec. 6, 2022

(54) CLOUD-BASED PLATFORM INSTRUMENTATION AND MONITORING SYSTEM FOR MAINTENANCE OF USER-CONFIGURED PROGRAMS

(71) Applicant: ServiceNow, Inc., Santa Clara, CA (US)

(72) Inventor: Jared Laethem, Carlsbad, CA (US)

(73) Assignee: ServiceNow, Inc., Santa Clara, CA (US)

( * ) Notice: Subject to any disclaimer, the term of this patent is extended or adjusted under 35 U.S.C. 154(b) by 324 days.

(21) Appl. No.: 16/659,152

(22) Filed: Oct. 21, 2019

(65) Prior Publication Data

US 2020/0117645 A1    Apr. 16, 2020

Related U.S. Application Data

(63) Continuation of application No. 15/013,483, filed on Feb. 2, 2016, now Pat. No. 10,482,072.

(51) Int. Cl.
*G06F 16/00* (2019.01)
*G06F 16/22* (2019.01)
(Continued)

(52) U.S. Cl.
CPC .......... *G06F 16/22* (2019.01); *G06F 11/3006* (2013.01); *G06F 11/3419* (2013.01);
(Continued)

(58) Field of Classification Search
CPC ...... G06F 8/60; G06F 9/5072; G06F 11/3006; G06F 11/301; G06F 11/3082; G06F 11/3452; G06F 11/3608; G06F 11/3688;
G06F 616/219; G06F 16/2255; G06F 16/24554; G06F 16/24568; G06F 16/285; G06F 16/95; G06F 21/335; G06F 21/44; G06F 21/53; G06F 21/556; G06F 21/566; G06F 21/6218; G06F 21/85; G06F 2201/815; G06F 30/13; G06F 8/70;
(Continued)

(56) References Cited

U.S. PATENT DOCUMENTS 6,816,898 B1    11/2004  Scarpelli
7,020,706 B2    3/2006   Cates
(Continued)

OTHER PUBLICATIONS

Extended European Search Report for European Patent Application No. 20156391.3 dated Apr. 24, 2020; 7 pgs.
(Continued)

*Primary Examiner* — Yicun Wu
(74) *Attorney, Agent, or Firm* — Fletcher Yoder PC

(57) ABSTRACT

Systems and methods for using instrumentation for maintenance of a user-configured program in a cloud computing environment are herein disclosed as comprising, in an implementation, intercepting operation data pertaining to the user-configured program, including a start time, an execution time interval, an operation, and an origin of the operation, canonicalizing the intercepted operation data by stripping operation-specific variable data from the operation data, aggregating the canonicalized operation data based on the start time, the canonicalized operation data, and the origin of the operation, and storing the aggregated operation data within a time series database in the execution time interval based on the start time.

20 Claims, 9 Drawing Sheets

(51) Int. Cl.
*G06F 16/954* (2019.01)
*G06F 16/957* (2019.01)
*G06F 11/34* (2006.01)
*G06F 11/36* (2006.01)
*G06F 11/30* (2006.01)
*G06F 11/32* (2006.01)

(52) U.S. Cl.
CPC ...... *G06F 11/3452* (2013.01); *G06F 11/3466* (2013.01); *G06F 11/3612* (2013.01); *G06F 11/3616* (2013.01); *G06F 11/3636* (2013.01); *G06F 16/2255* (2019.01); *G06F 16/954* (2019.01); *G06F 16/9577* (2019.01); *G06F 11/323* (2013.01); *G06F 2201/86* (2013.01); *G06F 2201/875* (2013.01)

(58) Field of Classification Search
CPC ........ G06F 8/77; G06F 9/45558; G06F 9/485; G06F 9/5005; G06F 9/5027; G06F 9/5077; G06F 9/541; G06F 9/547; G06F 11/079; G06F 12/0811; G06F 12/0822; G06F 12/0873; G06F 16/13; G06F 16/134; G06F 16/137; G06F 16/182; G06F 16/2474; G06F 16/25; G06F 16/907; G06F 17/16; G06F 17/18; G06F 21/32; G06F 3/061; G06F 3/0661; G06F 3/067

See application file for complete search history.

(56) References Cited

U.S. PATENT DOCUMENTS

| | | | |
|---|---|---|---|
| 7,716,353 | B2 | 5/2010 | Golovinsky |
| 7,769,718 | B2 | 8/2010 | Murley |
| 7,925,981 | B2 | 4/2011 | Pouheidari |
| 8,402,127 | B2 | 3/2013 | Solin |
| 8,600,911 | B2 | 12/2013 | Dageville et al. |
| 8,612,408 | B2 | 12/2013 | Trinon |
| 8,645,356 | B2 | 2/2014 | Bossman et al. |
| 8,666,970 | B2 | 3/2014 | Albrecht et al. |
| 8,832,652 | B2 | 9/2014 | Mueller |
| 9,065,783 | B2 | 6/2015 | Ding |
| 9,098,322 | B2 | 8/2015 | Apte |
| 9,122,552 | B2 | 9/2015 | Whitney |
| 9,317,327 | B2 | 4/2016 | Apte |
| 9,363,252 | B2 | 6/2016 | Mueller |
| 9,535,737 | B2 | 1/2017 | Joy |
| 9,645,833 | B2 | 5/2017 | Mueller |
| 9,654,473 | B2 | 5/2017 | Miller |
| 9,766,935 | B2 | 5/2017 | Kelkar |
| 9,805,322 | B2 | 10/2017 | Kelkar |
| 9,819,729 | B2 | 11/2017 | Moon |
| 2003/0065644 | A1 | 4/2003 | Horman et al. |
| 2009/0327242 | A1 | 12/2009 | Brown et al. |
| 2010/0061250 | A1 | 3/2010 | Nugent |
| 2010/0082599 | A1 | 4/2010 | Graefe et al. |
| 2010/0325124 | A1 | 12/2010 | Wu et al. |
| 2013/0205020 | A1 | 8/2013 | Broda et al. |
| 2014/0007178 | A1 | 1/2014 | Gillum et al. |
| 2014/0068053 | A1 | 3/2014 | Ravi et al. |
| 2014/0101058 | A1 | 4/2014 | Castel et al. |
| 2014/0317603 | A1 | 10/2014 | Gataullin et al. |
| 2014/0317604 | A1 | 10/2014 | Gataullin et al. |
| 2014/0325503 | A1 | 10/2014 | Li |
| 2015/0032881 | A1 | 1/2015 | Madani et al. |
| 2016/0323157 | A1 | 11/2016 | Marvasti et al. |
| 2017/0154181 | A1 | 6/2017 | Venkataramani et al. |

OTHER PUBLICATIONS

Canadian Office Action for Canadian Patent Application No. 3,013,332 dated Oct. 20, 2021; 5 pgs.

| OPERATION | STACK TRACE | HASHCODE | FIRST SIGHTING | AVERAGE EXECUTION TIME | EXECUTION COUNT | TOTAL EXECUTION TIME |
|---|---|---|---|---|---|---|
| SELECT 'storage_alias' FROM 'sys_storage'... | glide.scheduler.worker.0. com.glide.db.selectstorag ealiasfromsys_storage | 1559613 | 20150705_231854 | 35 MILLISECONDS | 1,487 | 52 SECONDS |
| UPDATE sys_status SET 'sys_updated_by'... | glide.policy.eventdelegatr. com.glide.db.updatesys_ statussetsys_updated_by | 6812129 | 20150706_083849 | 105 MILLISECONDS | 463 | 49 SECONDS |
| DELETE FROM ts_c_4_6 WHERE ts_c_4_6.do... | textIndex13.com.glide.db .stats.query.deletefromts _c_4_6 | 2353347 | 20150705_233635 | 36 MILLISECONDS | 4,959 | 2.97 MINUTES |
| SELECT sys_document0. 'element' FROM 'store'... | glide.scheduler.worker.1. com.glide.db.selectsys_d ocument0.element | 4815259 | 20150705_231854 | 42 MILLISECONDS | 125 | 5 SECONDS |

CLOUD-BASED PLATFORM INSTRUMENTATION AND MONITORING SYSTEM FOR MAINTENANCE OF USER-CONFIGURED PROGRAMS

CROSS REFERENCE TO RELATED APPLICATIONS

This application is a continuation of U.S. application Ser. No. 15/013,483, filed Feb. 2, 2016, the contents of which are herein expressly incorporated by reference for all purposes.

TECHNICAL FIELD

The present disclosure relates to a cloud-based platform instrumentation and monitoring system for maintenance of user-configured programs.

BACKGROUND

Cloud computing makes resources accessible to users using a scalable computing environment. In addition to infrastructure and application-level software, a typical cloud computing environment includes platform software that may be configured based on the needs of its users. For example, a customer of a platform provider may configure a web server program on the platform by adding or modifying scripts for executing routines that can be used to manage his or her business, but which are not native to the web server. That customer may further introduce a series of database queries within the program for retrieving information responsive to a script execution. A user's service and business management needs may change over time, and so the user may from time to time need to reconfigure the platform services included in the cloud computing environment to adapt to those changes.

SUMMARY

Disclosed herein are aspects of systems and methods for maintenance of user-configured programs. One aspect of the disclosure is an extensible cloud system for use in maintenance of a user-configured program using a web-based interface of the extensible cloud system, comprising a plurality of servers, each server comprising a processor and a memory, wherein the memory of at least one server of the plurality of servers includes code executable by the processor thereof to execute platform software comprising at least an application layer and a database layer, wherein the platform software permits a user to configure a program using user-configurable scripts and user-configurable database schema executable by the platform software, a time series database configured to store operation data within a plurality of discrete time intervals, and an instrumentation routine configured to intercept operation data pertaining to at least one operation of the user-configured program, the operation data comprising at least a start time, an execution time interval, and an origin, canonicalize the intercepted operation data by stripping operation-specific variable data from the operation data, aggregate the canonicalized operation data based on the start time, the canonicalized operation data, and the origin of the operation, and store the aggregated operation data in the time series database in the execution time interval based on the start time.

Another aspect of the disclosure is a method for executing an instrumentation routine on at least one server for use in maintenance of a user-configured program, comprising intercepting, by software executed on the at least one server, operation data pertaining to the user-configured program, wherein the operation data includes at least a start time, an execution time interval, and an origin of the operation, canonicalizing the intercepted operation data by stripping operation-specific variable data from the operation data, aggregating the canonicalized operation data based on the start time, the canonicalized operation data, and the origin of the operation, and storing, in a time series database executed on the server, the aggregated operation data in the execution time interval based on the start time.

Another aspect of the disclosure is a system, comprising a memory and a processor configured to execute instructions stored in the memory to intercept operation data pertaining to at least one operation of a user-configured program, wherein the operation data includes at least a start time, an execution time interval, and an origin of the operation, canonicalize the intercepted operation data by stripping operation-specific variable data from the operation data, generate a hashcode representative of at least the canonicalized operation data and the origin of the operation, aggregate the operation data based on the hashcode, and store the aggregated operation data in the time series database indexed by the execution time interval based on the start time.

Details of these implementations, modifications of these implementations and additional implementations are described below.

BRIEF DESCRIPTION OF THE DRAWINGS

The description herein makes reference to the accompanying drawings, where like reference numerals refer to like parts throughout the several views, and where:

FIG. 8 is an illustration of an example table representing operation data stored in a time series database;

DETAILED DESCRIPTION

Figure 1:
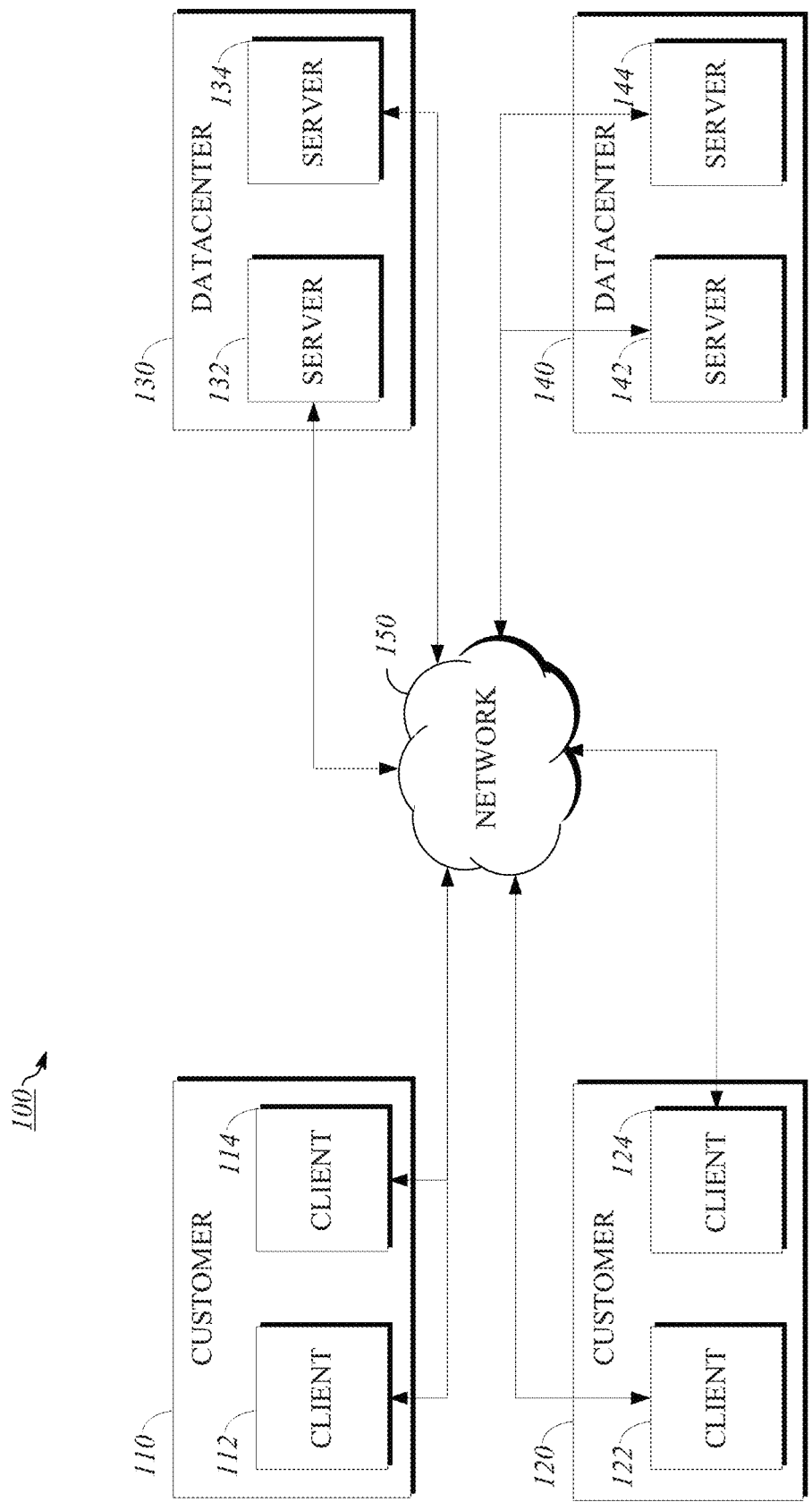
FIG. 1 is a block diagram of an example extensible cloud system.

In currently known platform-based cloud computing environments, users do not have access to robust debugging tools for identifying the root cause of performance issues, for example, across the application stack, database, business logic, and web services. Using a cloud-based platform, users may create, modify, or configure various scripts, database schema, and other operations throughout their programs. Over time, those operations may perform slower than expected or become unresponsive without proper maintenance including, without limitation, design and/or quality assurance. The ability to perform these tasks effectively is negatively impacted without robust tools to maintain the operation and performance of the user-configurable programs. For example, the process of debugging a program may be complicated by difficulties in identifying the distinct operations relating to or causing performance issues. Furthermore, conventional debugging tools are not available on cloud-based platforms, and thus users may not be able to identify the specific operation resulting in those issues. To the extent particular operations can be identified as the cause of slow program performance, a single occurrence of a performance issue may not be representative of typical or actual performance.

One solution for providing debugging tools in a platform-based cloud computing environment includes instrumentation for collecting data related to operations of user-configured programs, such as scripts and database queries that are executed by an included platform. The instrumentation processes the collected data by stripping certain operation-specific variables and aggregating the stripped data (i.e., by combining it with data pertaining to previously-collected operations including the same command or querying the same information, but which requested different field values). By doing so, the performance metrics for such operations may be identified over the lifetime of the program, and so users can identify and focus on debugging slow-performing operations.

Still, this solution does not identify the information necessary for cloud computing environment users to properly maintain their user-configurable programs. For example, the performance of given operations may change in response to the platform being reconfigured, and so it would be desirable to instead identify performance metrics for operations over discrete time intervals rather than a single aggregated average of performance metrics. Additionally, the performance metrics presented to the user include all instances of the given operation, regardless of the origin of the operation (e.g., the code or other operation that called for its execution). Thus, the aforesaid solution does not distinguish performance metrics for operations based on the origin of the operations.

Implementations of the present disclosure include platform software, a time series database, and an instrumentation routine for maintenance of user-configured programs, for example, by identifying trends in performance metrics with respect to the execution of operations of user-configured programs. The platform software allows a user, such as a customer of an information technology service provider, to configure a program using customizable scripts and database schema specific to their service or business management needs. The instrumentation routine intercepts data for operations executed by the platform software in connection with the user-configurable program, canonicalizes this intercepted operation data by removing variable-specific values, and aggregates the canonicalized operation data based in part on identity operation data, such as the origin of the operation. The aggregated operation data is stored in the time series database for a specified time interval and may be included as a stack trace within a stack of operations. A hashcode may be generated based on the identity operation data, for example, for indexing the aggregated operation data stored within the time series database and/or identifying the location of a corresponding stack trace within the stack of operations.

The stack of operations is a multi-tiered data structure (e.g., a stack) associated with a set of responsively-executed operations referred to as a sequence of operations. At a highest level entry it includes a stack trace indicative of operation data of a transaction. At incrementally lower level entries it includes stack traces indicative of operation data for other operations executed in response to the execution of the transaction ordered in the specific sequence in which they are executed by the platform software. Each entry within the stack of operations may be represented by its own row or level of the stack. In this way, a sequence of operations may be identified by observing related entries immediately preceding or following a given entry, as applicable. In an implementation, the stack of operations includes multiple sequences of operations. In an implementation, the stack of operations pertains to only a single sequence of operations. The origin of a database call or application function call may also be included in a stack trace, for example, by reference to a database identifier of a script, a filename of a Java file, a function name, or another indicator of origin. The instrumentation routine may include a log for recording information about entries of one or more stacks of operations, such as the stored or associated operation data for the entries.

Various operations of the user-configurable program can be executed by the platform software. For example, an operation may be a transaction, a script, or a database query. As used herein, a transaction is a request from a client interacting with the customer's server, such as a request to load a web page or open a web application. A script is a server-side operation written in Javascript, PHP, Perl, or another language and may be called as a result of a transaction execution or in response to the execution of another operation. A database query may be a SQL statement or other query for requesting information from, putting information into, or removing information from a subject database. The execution of one operation may necessarily result in the execution of subsequent, related operations, for example, to complete a given sequence of operations. Moreover, in an implementation, the origin of a given operation may refer not only to the operation that directly called the given operation, but to one or more operations that directly or indirectly resulted in the execution of the given operation, such as an associated transaction. Other types of operations may be executed by the platform software, including, without limitation, web service calls executing Java code, running compiled executables, etc.

In an implementation, operation data refers to metadata and other data associated with a given operation, which may be indicative of aspects of the operation's identity (e.g., its name, type, origin, stack location, etc.) or its performance (e.g., its start time, total execution time, etc.). The present disclosure may occasionally make specific reference to "identity operation data" or "performance operation data" for certain uses of operation data; however, where the disclosure merely references "operation data," it may refer to either or both of identity operation data and performance operation data, unless the context specifically indicates otherwise.

Thus, using the disclosed system, a user such as a system administrator or developer may granularly assess performance metrics for operations based on time interval and origin. For example, where a sequence of operations comprises ten different operations, performance operation data for each of the ten operations may be distinctly recorded based on corresponding identity operation data, such as the origin of each operation. The user may review these metrics to determine which one or more of those ten operations is slowing the performance of the initial transaction and failing to meet performance expectations. This granular information may be updated on a regular or irregular basis by aggregating the operation data for discrete time intervals. As such, the disclosed system may provide accurate performance metrics for debugging the sequence of operations such that a user may improve program performance by focusing maintenance efforts on those operations.

The systems and methods of the present disclosure address problems particular to cloud-based computing systems, particularly those that provide a platform. These cloud computing platform specific issues are solved by the disclosed implementations including instrumentation for granularly intercepting, and platform software for granularly representing, operation data for user-configurable programs in a cloud computing environment. The nature of a cloud-computing platform, which does not expose underlying applications and operating systems to the user for using traditional debugging techniques, necessitates the development of new ways to maintain (e.g., monitor, debug, troubleshoot, etc.) user-configured programs developed on cloud-based platforms.

To describe some implementations in greater detail, reference is first made to examples of hardware structures and interconnections. Computing resources of the cloud computing infrastructure may be allocated, for example, using a multi-tenant or single-tenant architecture. Under a multi-tenant architecture, installations or instantiations of application, database, and/or other software application servers may be shared amongst multiple customers. For example, a single web server (e.g., a unitary Apache installation), application server (e.g., unitary Java Virtual Machine) and/or a single database server catalog (e.g., a unitary MySQL catalog) may handle requests from multiple customers. In a multi-tenant architecture, data or applications used by various customers can be commingled or shared. In an implementation of this architecture, the application and/or database server software can distinguish between and segregate data and other information of the various customers using the system. For example, operation data identified within the multi-tenant architecture may be aggregated for each distinct customer.

Under a single-tenant infrastructure, separate web servers, application servers, and/or database servers are created for each customer. In other words, each customer will access its dedicated web server(s), will have its transactions processed using its dedicated application server(s), and will have its data stored in its dedicated database server(s) and or catalog (s). Physical hardware servers may be shared such that multiple installations or instantiations of web, application, and/or database servers may be installed on the same physical server. Each installation may be allocated a certain portion of the physical server resources, such as RAM, storage, and CPU cycles.

In an implementation, the web, application, and database servers may be allocated to different datacenters to facilitate high availability of the applications and data provided by the servers. For example, there may be a primary pair of web servers and application servers in a first datacenter and a backup pair of web servers and application servers in a second datacenter. Alternatively, there may be a primary database server in the first datacenter and a second database server in the second datacenter wherein the primary database server replicates data to the secondary database server. The cloud computing infrastructure may be configured to direct traffic to the primary pair of web servers which may be configured to utilize the primary pair of application servers and primary database server respectively. In a failure scenario, the secondary servers may be converted to primary servers.

The application servers may include platform software, written in Java, for example, that includes platform functionality for accessing the database servers, integrating with external applications, and rendering web pages and other content to be transmitted to clients. The platform software can be designed, for example, to permit rapid development or customization of IT service management or other applications. The platform functionality may be configured with metadata stored in the database server. In other words, the operation of the platform on the application server may be customized by certain end-users of the platform using user-configurable scripts and without requiring the Java code of the platform application to be changed. The database servers may include instances configured by a user using database schema to facilitate the operation of the platform software. For example, a database server instance may be configured with various tables for storing metadata about applications, tables/fields, transactions, scripts, queries, and custom user interface elements that are used to customize the appearance and operation of a user-configurable program using the platform software. In an implementation, the application servers may include web server functionality and the web servers may be omitted. In an implementation, the web, application, and database servers may be expressed as program modules on a single cloud server for using resources thereof.

FIG. 1 is a block diagram of an example extensible cloud system 100. The extensible cloud system 100 includes two customers 110, 120, although a greater number of customers may be contemplated. The customers may have clients, such as clients 112, 114 for customer 110 and clients 122, 124 for customer 120. Clients 112, 114, 122, 124 may be in the form of a computing system including multiple computing devices, or in the form of a single computing device, for example, a mobile phone, a tablet computer, a laptop computer, a notebook computer, a desktop computer, and the like. The customers and clients are shown as examples, and a cloud computing system such as extensible cloud system 100 may have a different number of customers or clients or may have a different configuration of customers or clients. For example, there may be hundreds or thousands of customers and each customer may have any number of clients.

The extensible cloud system 100 includes two datacenters 130, 140. Each datacenter includes servers, such as servers 132, 134 for datacenter 130 and servers 142, 144 for datacenter 140. Each datacenter may represent a different location where servers are located, such as a datacenter facility in San Jose, Calif. or Amsterdam, the Netherlands. Servers 132, 134, 142, 144 may be in the form of a computing system including multiple computing devices, or in the form of a single computing device, for example, a desktop computer, a server computer, mainframe computer, computer workstation, and the like. The datacenters and servers are shown as examples, and the extensible cloud system 100 may have a different number of datacenters and servers or may have a different configuration of datacenters and servers. For example, there may be tens of data centers and each data center may have hundreds or any number of servers.

Clients 112, 114, 122, 124 and servers 132, 134, 142, 144 are connected to network 150. The clients for a particular customer may connect to network 150 via a common connection point or different connection points. Network 150 may, for example, be or include the public Internet. Network 150 may also be or include a local area network, wide area network, virtual private network, or any other means of transferring data between any of clients 112, 114, 122, 124 and servers 132, 134, 142, 144. Network 150, datacenters 130, 140, and/or blocks not shown may include network hardware such as routers, switches, load balancers, and/or other network devices. For example, each of datacenters 130, 140 may have one or more load balancers (not shown) for routing traffic from network 150 to one or more servers such as servers 132, 134, 142, 144.

Other implementations of extensible cloud system 100 are also possible. For example, devices other than the clients and servers shown may be included in the system. In an implementation, one or more additional servers may operate as a cloud infrastructure control, from which servers and/or clients of the cloud infrastructure are monitored, controlled, and/or configured. For example, some or all of the techniques described herein may operate on said cloud infrastructure control servers. Alternatively or in addition, some or all of the techniques described herein may operate on servers such as servers 132, 134, 142, 144.

The data processing components of this disclosure, including the cloud computing environment of FIG. 1, may be implemented by various hardware devices. The makeup of these subcomponents is described in greater detail below, with reference to FIGS. 2 and 3.

Figure 2:
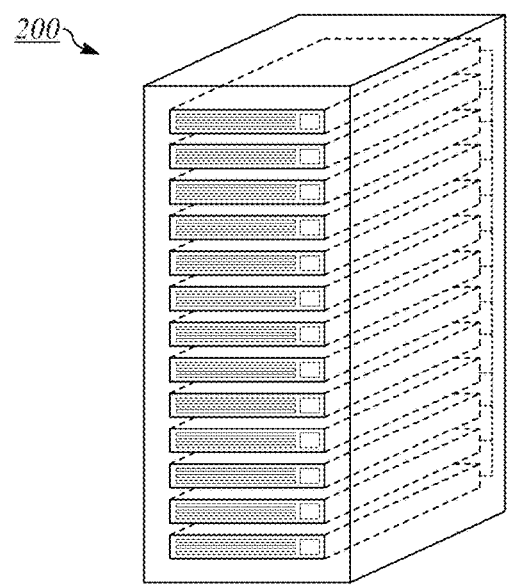
FIG. 2 is a perspective view of a storage enclosure for housing computing equipment usable within implementations of the extensible cloud system.

FIG. 2 is a perspective view of a storage enclosure 200 for housing computing equipment usable within implementations of extensible cloud system 100. FIG. 2 shows a storage enclosure 200 housing computer servers, such as one or more of servers 132, 134, 142, 144. One implementation of this structure includes a computer hardware rack or other storage enclosure, frame, or mounting that houses rack mounted servers. In this example, the computer servers include their own power supplies and network connections. Another implementation includes a blade enclosure containing blade servers. The blade enclosure includes power supplies, cooling units, and networking components shared by the constituent blade servers. A control center (not shown) may be included to supervise and collectively manage operations of the racked computer servers.

Figure 3:
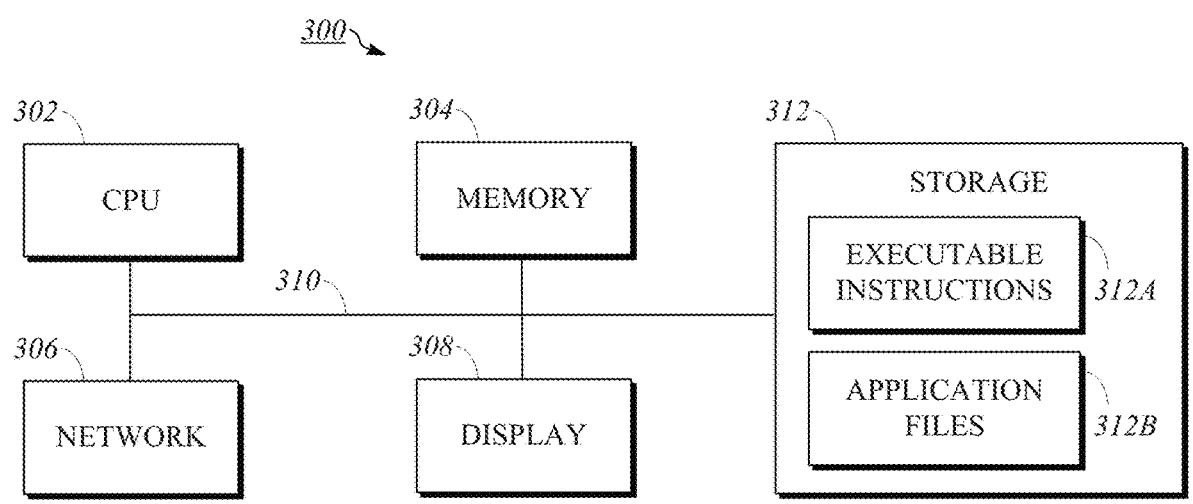
FIG. 3 is a block diagram of a digital data processing machine usable within implementations of the extensible cloud system.

FIG. 3 is a block diagram of a digital data processing machine usable within implementations of extensible cloud system 100. Machine 300 may be implemented by one or more computing devices such as a mobile telephone, a tablet computer, laptop computer, notebook computer, desktop computer, server computer, mainframe computer, computer workstation, and the like.

In an implementation, machine 300 includes CPU 302, memory 304, storage 312, network component 306, display 308, and bus 310. One example of CPU 302 is a conventional central processing unit. CPU 302 may include single or multiple processors each having single or multiple processing cores. Alternatively, CPU 302 may include another type of device, or multiple devices, capable of manipulating or processing information now-existing or hereafter developed.

Memory 304 may comprise RAM or any other suitable type of storage device. The memory 304 may include executable instructions and data for immediate access by CPU 302. Memory 304 may include one or more DRAM modules such as DDR SDRAM. Alternatively, memory 304 may include another type of device, or multiple devices, capable of storing data for processing by CPU 302 now-existing or hereafter developed. CPU 302 may access and manipulate data in memory 304 via bus 310.

Storage 312 may include executable instructions 312A and application files 312B along with other data. Executable instructions 312A may include, for example, an operating system and one or more application programs for loading in whole or part into memory 304 and to be executed by CPU 302. The operating system may be, for example, Windows, Mac OS X, Linux, or another operating system suitable to the details of this disclosure. The application programs may include, for example, a web browser, web server, database server, and other such programs. Some examples of application files 312B include client/user files, database catalogs, and configuration information. Storage 312 may comprise one or multiple devices and may utilize one or more types of storage, such as solid state or magnetic.

The internal configuration may also include one or more input/output devices, such as network component 306 and display 308. Network component 306 and display 308 may be coupled to CPU 302 via bus 310, in one example. Network component 306 may, for example, include a network interface and may take the form of a wired network interface such as Ethernet or a wireless network interface. Other output devices that permit a client/user to program or otherwise use the client or server may be included in addition to or as an alternative to display 308. When the output device is or includes a display, the display may be implemented in various ways, including by a LCD, CRT, LED, OLED, etc.

Other implementations of the internal architecture of clients and servers are also possible. For example, servers may omit display 308 as well as client programs such as web browsers. Operations of CPU 302 may be distributed across multiple machines which may be coupled directly or across a local area or other network. Memory 304 and/or storage 312 may be distributed across multiple machines such as network-based memory or memory in multiple machines performing the operations of clients or servers. Although depicted here as a single bus, bus 310 may be composed of multiple buses.

Various instances of digital data storage may be used to provide storage internal and/or external to the components previously described and illustrated. Depending upon its application, such digital data storage may be used for various functions, such as storing data and/or storing machine-readable instructions. These instructions may themselves support various processing functions, or they may serve to install a software program upon a computer, where such software program is thereafter executable to perform other processing functions related to this disclosure. In any case, the storage media may be implemented by nearly any mechanism to digitally store machine-readable signals, such as CD-ROM, WORM, DVD, digital optical tape, or other optical storage. Another example is direct access storage, such as a conventional "hard drive," redundant array of inexpensive disks (RAID), or another direct access storage device (DASD). Another example is serial-access storage such as magnetic or optical tape. Still other examples of digital data storage include electronic memory such as ROM, EPROM, flash PROM, EEPROM, memory registers, battery backed-up RAM, etc.

In an implementation, a storage medium is coupled to a processor so the processor may read information from, and write information to, the storage medium. In the alternative, the storage medium may be integral to the processor. In another example, the processor and the storage medium may reside in an ASIC or other integrated circuit.

In contrast to storage media that contain machine-executable instructions, as described above, a different embodiment uses logic circuitry to implement some or all of the processing features described herein. Depending upon the particular requirements of the application in the areas of speed, expense, tooling costs, and the like, this logic may be implemented by constructing an application-specific integrated circuit (ASIC) having thousands of integrated transistors. Such an ASIC may be implemented with CMOS, TTL, VLSI, or another suitable construction. Other alternatives include a digital signal processing chip (DSP), discrete circuitry (such as resistors, capacitors, diodes, inductors, transistors, and the like), field programmable gate array (FPGA), programmable logic array (PLA), programmable logic device (PLD), and the like.

Relatedly, one or more clients or servers or other machines described herein may include an ASIC or programmable logic array such as a FPGA configured as a special-purpose processor to perform one or more of the operations or steps described or claimed herein. An FPGA may include a collection of logic blocks and RAM blocks that may be individually configured and/or configurably interconnected in order to cause the FPGA to perform certain functions. Certain FPGAs may contain other general or special purpose blocks as well. An FPGA may be programmed based on a hardware definition language (HDL) design, such as VHSIC Hardware Description Language or Verilog.

Having described the structural and related features of the present disclosure, certain operational aspects of the disclosure will now be described with reference to FIGS. 4-7.

Figure 4:
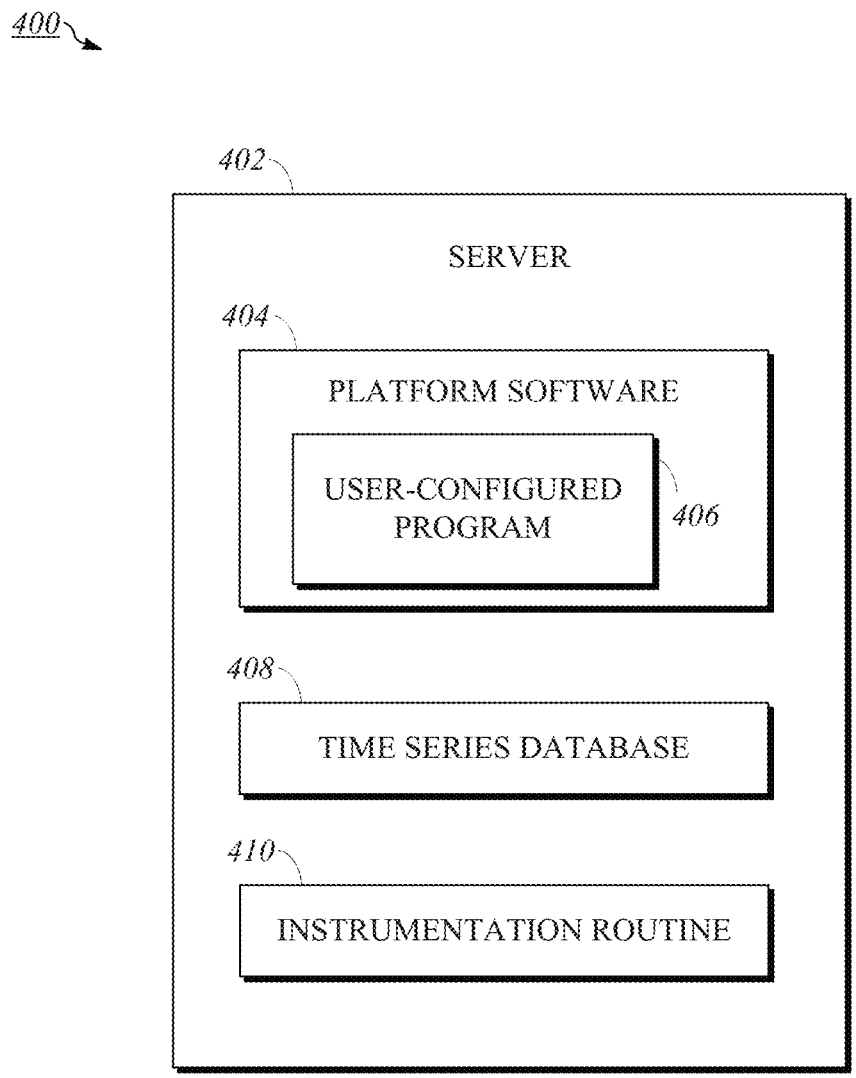
FIG. 4 is a block diagram of a server usable within implementations of the extensible cloud system.

FIG. 4 is a block diagram 400 of a server 402 usable within implementations of the extensible cloud system. In an implementation, server 402 is a digital data processing machine such as machine 300 and may be one of servers 132, 134, 142, 144. Server 402 comprises code executable by a CPU for executing platform software 404, time series database 408, and instrumentation routine 410. In an implementation, the code for executing platform software 404, time series database 408, and instrumentation routine 410 may be executed on a plurality of servers, for example, wherein each server of the plurality of servers executes one or two of platform software 404, time series database 408, and instrumentation routine 410.

Platform software 404 is an application for delivering services and/or managing user processes. In an implementation, platform software 404 comprises an application layer and a database layer, where scripts and database schema may be included for configuring a user program. In an implementation, platform software 404 includes various components at the application layer, for example, a custom application record (e.g., information identifying an application and associated artifacts which maintains configuration records for the application), user interface elements (e.g., data structures and tables that store data indicative of a user interface of the application), and dependencies (e.g., data indicative of other applications, data structures, and tables on which a custom application records and other application features depend). In an implementation, platform software 404 includes application layer components for serving, distributing, or otherwise communicating data to one or more user interfaces, for example, running on one or more mobile devices.

Platform software 404 can include platform functionality for accessing database servers, integrating with external applications, and rendering web pages and other content in response to client requests. Platform software 404 may in certain instances be most frequently utilized to interface with web services; however, platform software 404 generally provides an interface for interacting with a given platform, such as for accessing data and/or services stored within or otherwise utilized in connection with the platform. Platform software 404 is configured to execute one or more operations of user-configured program 406, which operations may be intercepted by instrumentation routine 410. In an implementation, instrumentation routine 410 may also be used to intercept operations provided by or within platform software 404, as well as operations of platform software 404, itself. In an implementation, platform software 404 is a Java Virtual Machine configured using scripts and database schema.

Time series database 408 is optimized to store time series data, which, in an implementation, includes performance operation data for operations executed by platform software 404. In an implementation, time series database 408 is further optimized to update and/or cull the time series data. For example, time intervals may be culled by deleting the intervals older than a retention period (e.g., those that are no longer relevant for identifying performance metrics). In an implementation, older time intervals are not automatically removed and may be non-removable, or removed by manual action. The time series data is stored by time series database 408 within a plurality of discrete time intervals, and the performance operation data stored in time series database 408 is indexed based on those time intervals. In an implementation, the discrete time interval for which a given operation is stored in time series database 408 is predetermined by platform software 404 or an approved user (e.g., a system administrator or developer) prior to, upon, or during the execution of the operation. In an implementation, time series database 408 is a round-robin database.

In an implementation, time series database 408 may be configured to delete certain time series data stored prior to the expiration of an associated execution time interval. For example, the data may be deleted due to memory constraints or where a user-reconfiguration of the underlying program has rendered operations irrelevant. In deleting time series data, time series database 408 may first determine the relative importance for one or more time series data entries by identifying the total execution count of corresponding operations over a given time interval. For example, operations that are more frequently executed by platform software 404 may be presumed to be more important than those that are executed less frequently. Time series database 408 then deletes the least important time series data entries to prepare space for storing new time series data entries.

Instrumentation routine 410 intercepts and processes data for operations executed by platform software 404 for user-configured program 406. In an implementation, and as will be discussed in further detail below with respect to FIGS. 6 and 10, instrumentation routine 410 is configured to intercept operation data pertaining to the execution by platform software 404 of at least one operation of the user-configured program, canonicalize the intercepted operation data by stripping (e.g., removing) operation-specific variable data, aggregate the canonicalized operation data based on identity operation data for the operation, and store the aggregated operation data within time series database 408 for a specified time interval. Instrumentation routine 410 may be further configured to graphically represent the aggregated operation data, which may assist users in identifying program performance issues over discrete time intervals. In an implementation, instrumentation routine 410 comprises instructions included as part of and executed by platform software 404. In an implementation, instrumentation routine 410 comprises instructions executed by, but not included as part of, platform software 404.

Figure 5:
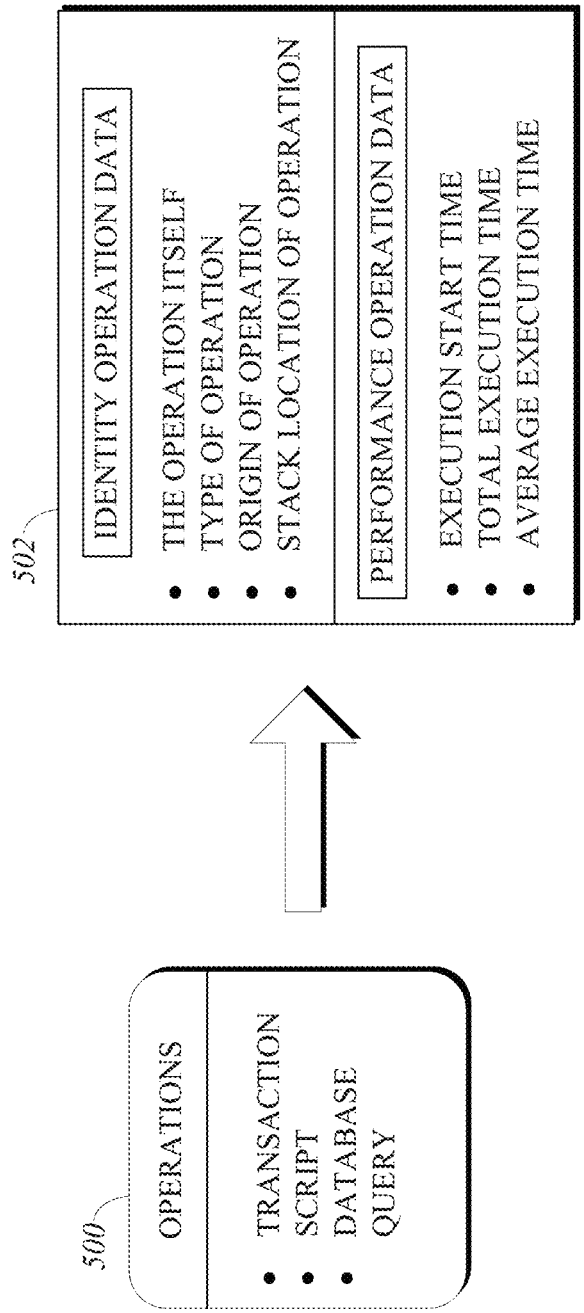
FIG. 5 is a diagram of example operation data associated with operations executed by platform software for a user-configured program.

FIG. 5 is a diagram of example operation data 502 associated with operations 500 executed by platform software 404 for user-configured program 406. As previously discussed, an operation may be a transaction, script, or database query and may be configured by a user to meet the needs of user-configured program 406. Operation data 502 is divided into two types of data. First, identity operation data refers to metadata indicative of the operation and other data representative of the operation. For example, the identity operation data may include the operation itself (e.g., the specific script of database query to be executed), the type of operation (e.g., an indication of whether the operation is a transaction, script, or database query), the origin of the operation, and a location of an entry representative of the operation within a stack of operations. Some of the identity operation data may be intercepted from platform software 404 by instrumentation routine 410, such as the operation itself, the type of operation, and the origin of the operation, whereas other identity operation data may be later determined, such as the location within the stack of operations.

Second, performance operation data refers to data representative of the operation's performance, which may later be reviewed or analyzed by a user to evaluate trends and performance issues with respect to user-configured program 406. For example, the performance operation data may include the execution start time (e.g., the time at which the operation begins executing, as may be indicated by a timestamp or identified using a system timer), a total execution time (e.g., the time at which the operation finishes executing, as may also be indicated by a timestamp or identified using a system timer), and an average execution time (e.g., the average time it takes that particular operation to execute). In an implementation, at least some types of performance operation data may be represented in metadata, such as the start time. The types of identity operation data and/or performance operation data depicted in the figure are shown for illustrative purposes, and any other types of identity operation data and/or performance operation data may be used with extensible cloud system 100 as may be useful in identifying performance metrics for operations of user-configured programs.

Figure 6:
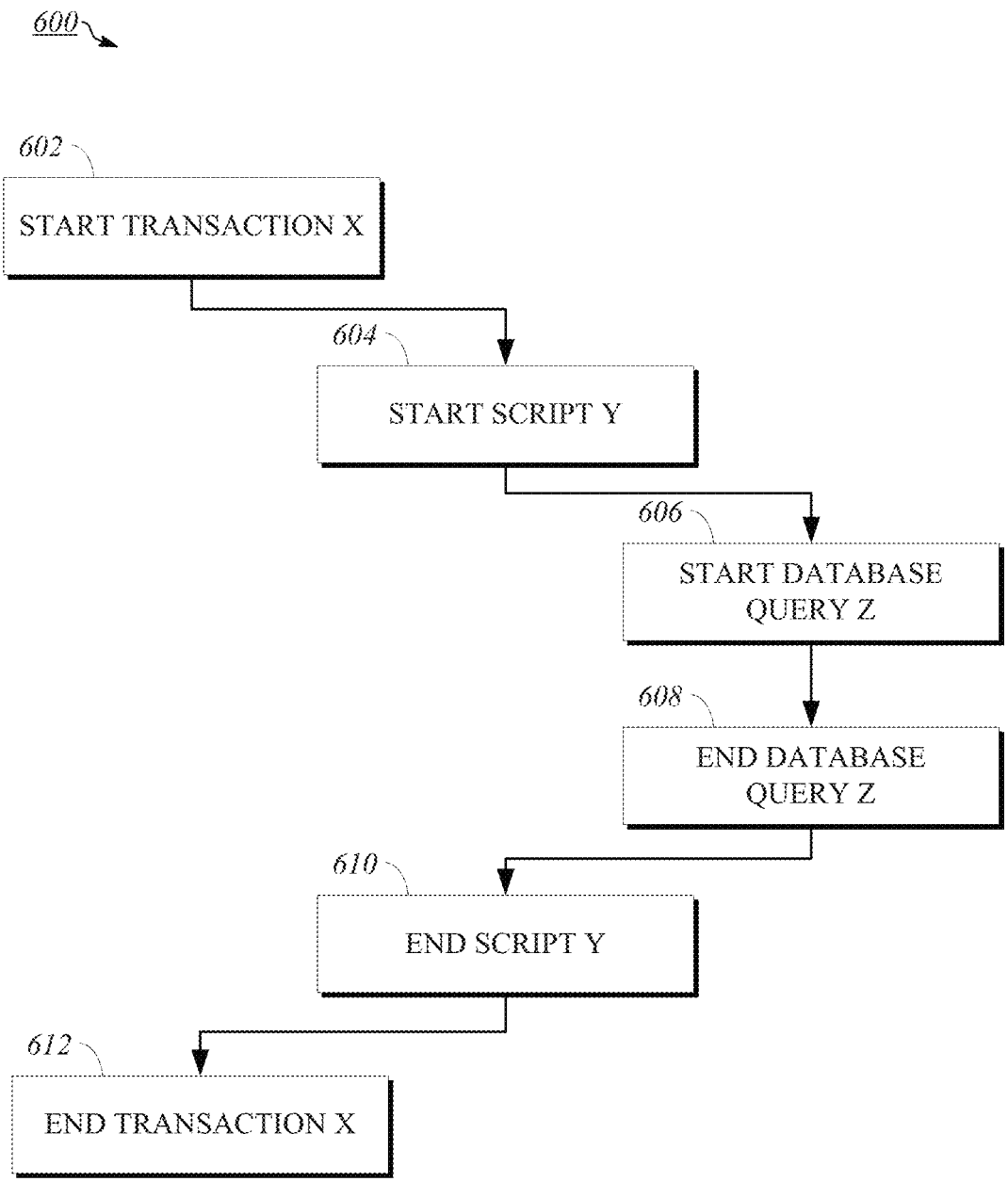
FIG. 6 is an illustration showing an example sequence of operations executed by platform software for a user-configured program.

FIG. 6 is an illustration showing an example sequence of operations 600 executed by platform software 404 for user-configured program 406. Sequence 600 initiates with a call to start a transaction, Transaction X, at 602. The execution of Transaction X responsively calls a script, Script Y, to start running 604, which Script Y responsively calls a database query, Database Query Z, to start running at 606. Once Database Query Z ends at 608, Script Y, the script that called it, ends at 610 in response to Database Query Z ending. Transaction X thereafter ends at 612 in response to Script Y ending. Thus, sequence 600 begins and ends with reference to Transaction X. Sequence 600 may be indicated in a stack of operations or other data structure, for example, by reference to entries immediately preceding and/or following a given entry, as applicable.

Figure 7:
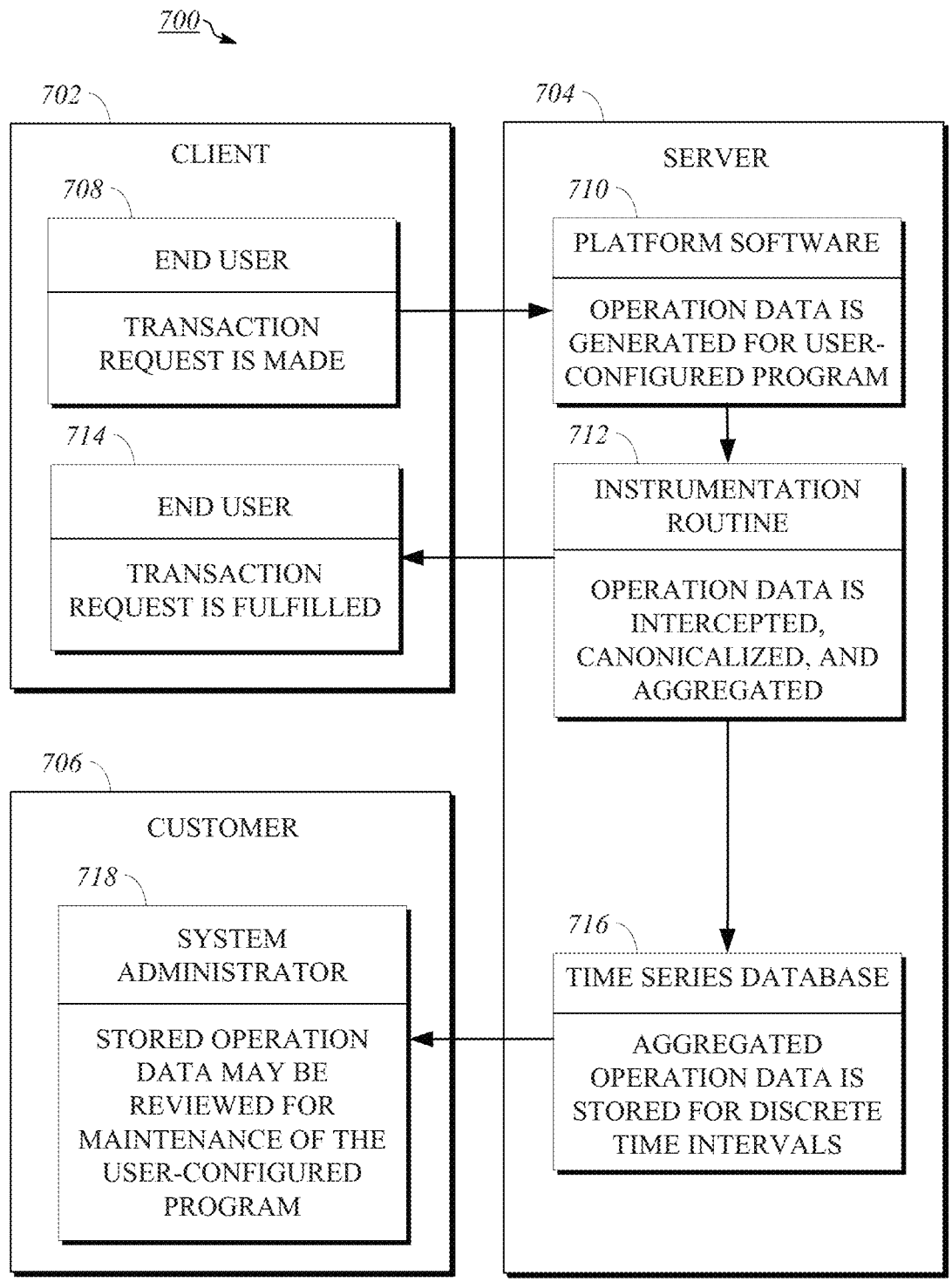
FIG. 7 is a logic diagram showing how an operation is processed within implementations of the extensible cloud system.

FIG. 7 is a logic diagram 700 showing how an operation is processed within implementations of extensible cloud system 100. For purposes of discussing logic diagram 700, the operation referred to herein is a transaction, however logic diagram 700 also applies where the operation is a script or database query.

As shown, logic diagram 700 includes processing by three machines, such as client 702, which may be any of clients 112, 114, 122, 124, server 704, which may be any of servers 132, 134, 142, 144, and customer 706, which may be any of customers 110, 120. The execution of an operation begins at client 702 with an end user making a request for a transaction at 708 to interact with a user-configured program, such as user-configured program 406. For example, the end user may be requesting access to a uniform resource locator (URL) or the running of a web-based program. The transaction request is communicated to server 704, which includes information necessary for processing the transaction request (e.g., wherein server 704 hosts the website pertaining to the requested URL). At 710, platform software, such as platform software 404, generates operation data for the user-configured program. In an implementation, generating the operation data at 710 comprises one or more of creating data indicative of the operation requested by the end user at 708 using information communicated to the platform software, selecting data indicative of the requested operation from a list of possible candidates, or otherwise determining data indicative of the requested operation by processing it in accordance with the request.

At 712, an instrumentation routine, such as instrumentation routine 410, intercepts the operation data from the platform software and thereafter canonicalizes and aggregates it. The processes of canonicalizing intercepted operation data and aggregated canonicalized operation data are described in detail below with respect to FIG. 10. Once processed by the instrumentation routine, data indicative of the processed operation is communicated from server 704 back to client 702 such that the end user receives an indication of the transaction request being fulfilled at 714 (e.g., by the requested URL loading or web-based program executing). Although the figure depicts the data indicative of the processed operation being communicated from server 704 to client 702 by the instrumentation routine, in many cases such data will be communicated from the platform software or possibly another component in communication with the platform software.

At 716, the instrumentation routine stores the aggregated operation data in a time series database, such as time series database 408, for a discrete time interval. The process of storing aggregated operation data in a time series database is described in detail below with respect to FIG. 10. However, once stored, the operation data is capable of being reviewed or analyzed to evaluate trends in performance metrics for the transaction. Thus, at 718, customer 706 receives from server 704 an indication of the stored operation data such that a user, such as a system administrator, may review the performance of the transaction. For example, the system administrator can determine if the transaction took longer to execute than is typical and may assess other information to determine whether any issues are present with respect to the transaction. Using these performance metrics, the system administrator may perform maintenance on the user-configured program to improve efficiency or performance.

Although the figure depicts an operation being requested by and processed for an end user with a system administrator reviewing the resulting performance metric data, logic diagram 700 applies to other situations, as well. For example, logic diagram 700 also demonstrates the flow of an operation request in a development cycle of the user-configured program, where the end user is a tester and the system administrator is the developer. In that maintenance accounts for the lifecycle of the user-configured program from development through its end life, the present disclosure may be used in a variety of contexts to provide maintenance for user-configured programs.

FIG. 8 is an illustration of an example table 800 representing operation data stored in a time series database. Table 800 may be included as part of a user interface, for example, as a graphical representation output to display on a user computer. In an implementation, table 800 comprises rows indicative of stored operation data processed by the instrumentation routine (e.g., wherein each row is associated with a different hashcode) and columns representative of various fields corresponding to the stored operation data, such as identity operation data and performance operation data aggregated by the instrumentation routine. Table 800 may include, for example, columns for the operation, stack trace, hashcode, first sighting, average execution time, execution count, and total execution time. Other types of operation data as may be determined to be useful to analyzing performance metrics of corresponding operations may also be included within table 800 or other tables graphically represented for the user.

Figure 9:
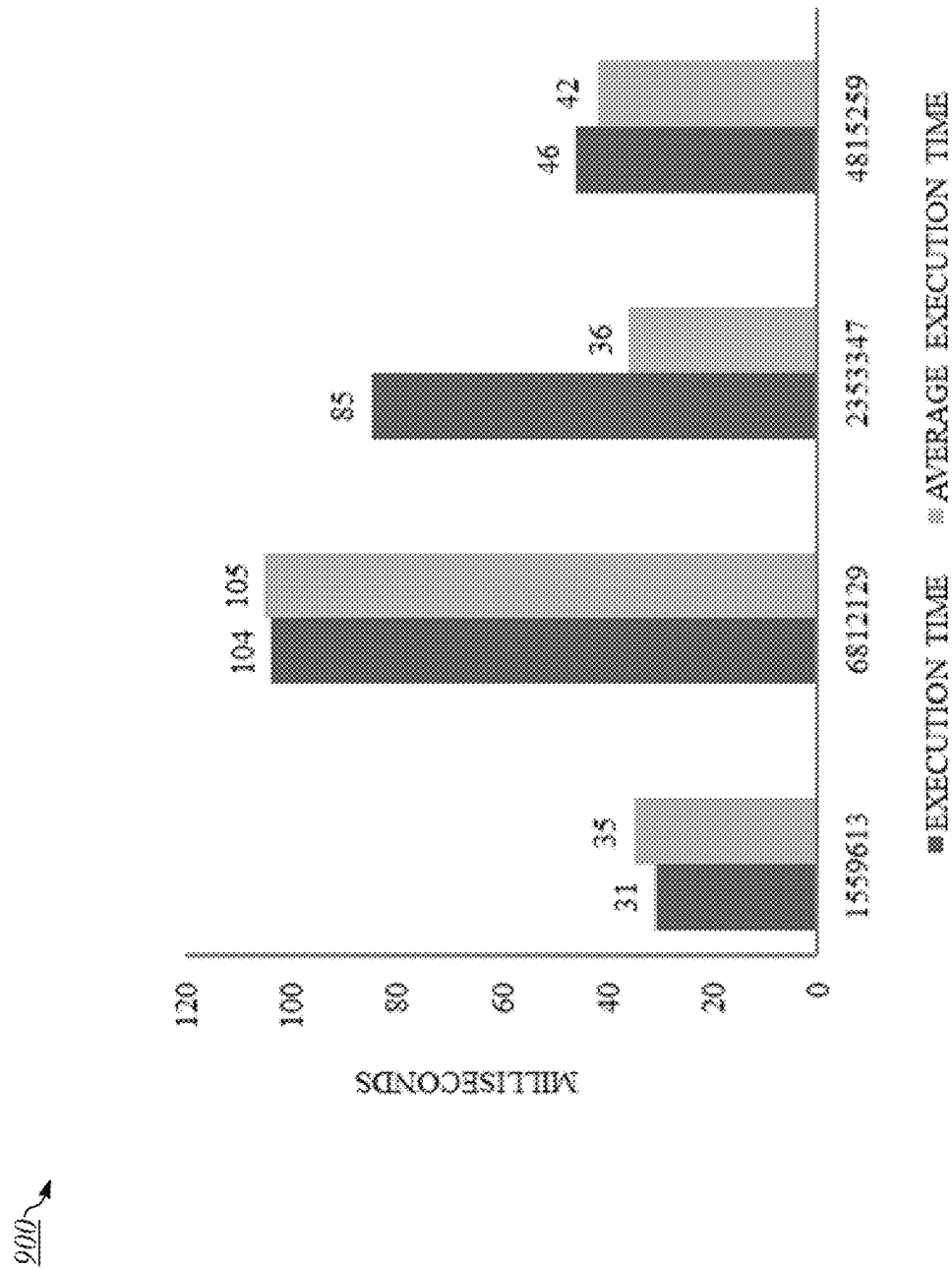
FIG. 9 is an illustration of an example bar graph displaying a comparison of operation data stored in a time series database.

FIG. 9 is an illustration of an example bar graph 900 displaying a comparison of operation data stored in a time series database. Like the table of the previous figure, bar graph 900 may be included as part of a user interface, for example, as a graphical representation output to display on a computer. In an implementation, bar graph 900 comprises data for comparing operation data values for one or more entries in the time series database. For example, and as depicted in the figure, bar graph 900 may depict a comparison of a newly executed operation's execution time against the average execution time for the operation, as aggregated in the time series database. Other values may be compared by bar graph 900. In an implementation, the user may designate particular fields of data for entries of the time series database to be represented by bar graph 900. Further, while the figure illustrates the graphical representation as a bar graph, the data may be graphically represented in any visual form, including, without limitation, a line graph, pie chart, scatter plot, etc.

Figure 10:
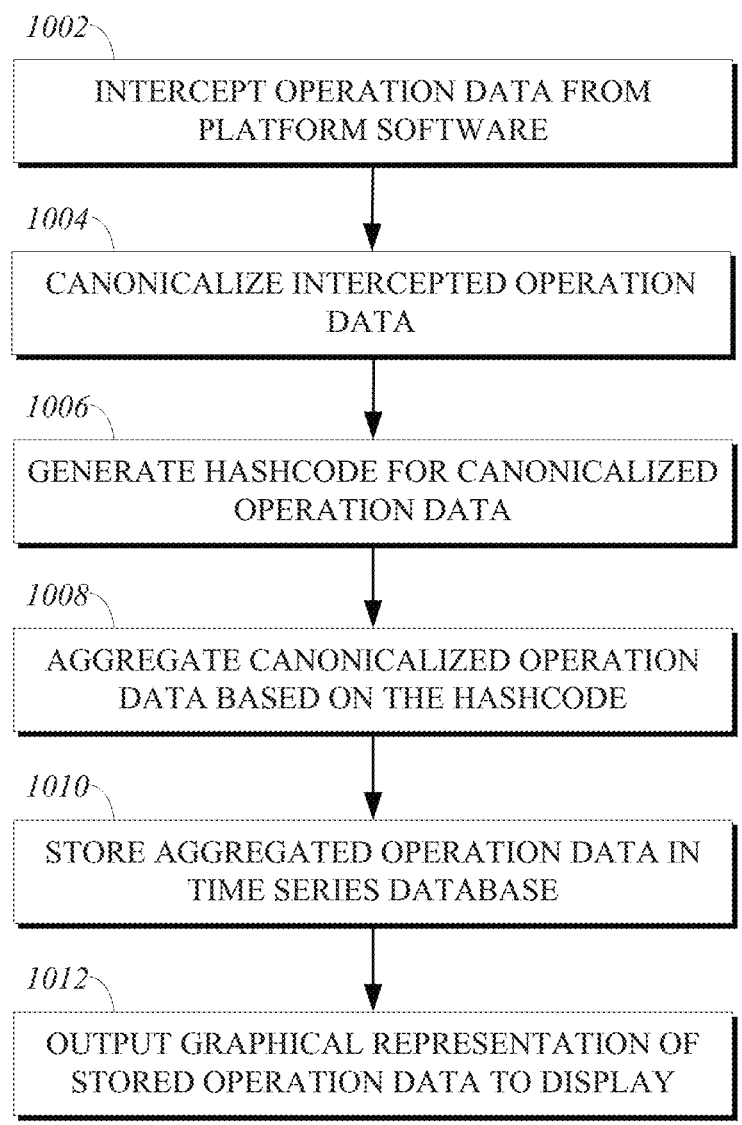
FIG. 10 is a flowchart showing an example method for using an implementation of the extensible cloud system for maintenance of a user-configured program.

FIG. 10 is a flowchart showing an example method 1000 for using an implementation of extensible cloud computing system 100 for maintenance of a user-configured program. In an implementation, method 1000 may be executed using machines and hardware such as the equipment of FIGS. 1-3. In a more particular example, method 1000 may be performed by an instrumentation routine, such as instrumentation routine 410. In an implementation, the instrumentation routine is executed entirely or in part as a machine-readable program of Java, Javascript, C, C++, or other such instructions.

For ease of explanation, method 1000 is described and illustrated as a series of steps. However, steps in accordance with this disclosure may occur in various orders and/or concurrently. Additionally, steps in accordance with this disclosure may occur with other steps not presented and described herein. Furthermore, not all illustrated steps may be required to implement a method in accordance with the disclosed subject matter. The steps of any method, process, or algorithm described in connection with the implementations disclosed herein may be implemented or embodied directly in hardware, firmware, software executed by hardware, circuitry, or a combination of these.

At step 1002, the instrumentation routine intercepts operation data for a given operation executed by the platform software. This can be accomplished in any number of ways. For example, the instrumentation routine may include programmable instructions for tracking a stack of operations. At the beginning of an operation, a start method may be performed for entering the operation as an entry within the stack of operations. At the end of the operation, an end method may be performed for removing the corresponding entry from the stack of operations. The start and end methods are further indicative of instances where a given operation calls one or more additional operations.

In an implementation, operation data for given operations is intercepted by the instrumentation routine before the execution of the corresponding operations. This may occur, for example, where the instrumentation routine (or other components in communication with the instrumentation routine, such as the platform software) determines that other operations will be executed in response to the execution of the given operation (e.g., as part of a sequence of operations). In this case, the instrumentation routine may intercept operation data for one or more operations before any or all of them are executed by the platform software. As an alternative, in an implementation, operation data may be intercepted upon the completion of each operation's execution. However, implementations of the present disclosure may include multiple of the above-described features, for example, where certain operations are executed by the platform software before corresponding operation data is intercepted by the instrumentation routine and certain others are not.

In an implementation, intercepting operation data first requires that the operation corresponding to the operation data be identified. The information used to identify operations may depend upon the operation type. For example, transactions may be identified by one or more of a URL or web page name, a processor used to execute the transaction or thread name used with the processor, a form or list action, filters associated with a URL query, a table name, etc. Scripts may be identified by one or more of a system table, file path, line number, table field, etc. Database queries may be identified by one or more of an insert, update, select, or like statement included as part of the query, selected columns, where clauses, unions, column sets, etc. In an implementation, the information used to identify a given operation is communicated to the instrumentation routine as metadata.

In an implementation, the operations intercepted by the instrumentation routine are identified based on an identifier value associated with the operation, for example, as metadata, or the operations may include an identifier value for identifying one or more operations to be called in response to their execution. For example, a script may include a reference to a system identification code indicative of the type of script to execute, a table associated with the system identification code where various scripts are stored, and a field within the table that includes the specific script to be executed as a next operation in a sequence of operations. Another example of an identifier value would be a special code included in a URL for indicating page features or browsing data where the request for the URL is a transaction.

The operation data may be sorted upon interception into various groupings where a first grouping represents all calls to that operation and additional groupings represent calls to that operation from another given operation. In an implementation, the groupings may be represented by temporarily stored data in a cache, table, or other data structure. In an implementation, the origin of each operation may be determined based on data accessible from an interface with the platform software.

In an implementation, the instrumentation routine intercepts operation data by utilizing data structures (e.g., stacks, queues, etc.) provided by one or more programming languages. For example, the instrumentation routine may identify data within a data structure as relating to a sequence of operations including a given operation. Depending on how much data within the data structure is relevant with respect to a given operation, the instrumentation routine may intercept data from a part of or the whole data structure. Further, the data structures may be used to identify an identifier value indicative of next operations in a sequence of operations, as discussed above.

In an implementation, intercepting the operation data includes using a timer to identify performance operation data. For example, the timer may be started upon an operation beginning to execute and stopped upon the execution completing, such that a total execution time for the operation may be calculated based on the start and end times. The timer may be implemented using one or more scripts for identifying a timestamp of the execution start and stop times and communicating same to the instrumentation routine to calculate a total execution time.

Additional hardware components may be included, for example, for initiating the instrumentation routine and/or intercepting operation data from the platform software. In an implementation, a sensor may be included in a machine on which the platform software is executed. The sensor may be coupled to a CPU of the machine to measure cycles of and heat generated by the CPU, which sensor, upon achieving a set threshold measurement, may send instructions to the CPU or a CPU of another machine to execute the instrumentation routine.

At step 1004, after intercepting the operation data, the instrumentation routine canonicalizes the intercepted operation data by stripping (e.g., removing) operation-specific variable data. Canonicalizing the operation data prepares it for aggregation with similar operations by the instrumentation routine, which aggregation process will be described in detail below. For example, parameters included within a where clause of a SQL query, such as the value "Jared" within the statement SELECT from USER where name="Jared", can be removed so that the function and substance of the query is isolated, resulting in the canonicalized query SELECT from USER where name="*". As such, each operation canonicalized to the query SELECT from USER where name="*" can be aggregated to better represent the data intercepted and processed by the instrumentation routine. For example, in this case, it is expected that all queries of this form will behave similarly from a performance standpoint regardless of the value of "name" that is searched for. In this way, performance operation data for SQL queries requesting a user's name, such as the average time the requests take and the total time the system has spent executing those queries, can be assessed by a user to determine if those types of queries are causing performance issues. Once aggregated, as described in further detail below, performance metrics for specific types of operations can be identified based on the origin of each operation, for example, to determine if performance issues related to those operations only present within certain sequences of operations.

In an implementation, the instrumentation routine canonicalizes the intercepted operation data by executing scripts to search the operation string for terms not included within a given code library or to parse the corresponding identity operation data for values included as variable data using conventional methods, such as by identifying data contained within quotation marks or following an equation modifier.

In an implementation, the intercepted operation data is canonicalized by referencing a list, table, or similar data structure wherein portions of the corresponding operation are separately stored. For example, where the operation is a database query, a list may include a field "Type" indicating the type of query such as "SELECT from," a field "Table" indicating a table to query data from such as "USER," a field "Query" indicating the variable or type of value(s) to be searched for such as "NAME," and a field "Where" indicating the value(s) to be searched for such as "Jared." In this case, the intercepted operation data may include a pointer to specific field values within a list to identify the operation to the instrumentation routine. Thus, to canonicalize this database query, the instrumentation routine may copy data from the specified fields except for the "Where" field, which contains the operation-specific variable data.

In an implementation, the intercepted operation data may be canonicalized based on an in-memory data structure generated or otherwise identified using one or more application programming interfaces (APIs) of the platform software. For example, a structured API for a database query called as an operation may include a data structure used in connection with the execution of the database query (e.g., in generating the query). The instrumentation routine may thus remove applicable data values by directly extracting same from the one or more objects describing the operation. Other methods of canonicalization may also be used to generalize operation data to improve or ease aggregation of operation data.

Similar to intercepting data in step 1002, in an implementation, operation data for given operations is canonicalized by the instrumentation routine before the execution of the corresponding operations. This may occur, for example, where the instrumentation routine (or other components in communication with the instrumentation routine, such as the platform software) determines that other operations will be executed in response to the execution of the given operation (e.g., as part of a sequence of operations). In this case, the instrumentation routine may intercept operation data for one or more operations before any or all of them are executed by the platform software.

Notwithstanding the foregoing, some operations may not include operation-specific variable data to be canonicalized, in which case the corresponding canonicalized operation data would simply be an aspect of the identity operation data, as intercepted (e.g., the operation without any variable data removed). Furthermore, some types of operation data may inherently not be subject to canonicalization. For example, date and time data identifying the first sighting of a given operation and the latest or last sighting of the operation does not include variable values and thus cannot be canonicalized by the instrumentation routine.

At step 1006, a hashcode representative of the canonicalized operation data is generated. As will be discussed in further detail below, the hashcode generated for canonicalized operation data is used to aggregate that canonicalized operation data with other operation data associated with the same hashcode and already stored within the time series database.

In an implementation, a hashcode generated for the canonicalized operation data may be representative of identity operation data, such as an origin of the operation and the canonicalized operation field. In an implementation, the hashcode may be representative of an execution time interval associated with the canonicalized operation data. In an implementation, the hashcode may be associated with the canonicalized operation data for a specified execution time interval. In that they represent and correspond to distinct data stored within the time series database, hashcodes are indicative of information that may benefit a client or other user in maintenance of a user-configured program executing in connection with the platform software.

Accordingly, in an implementation, generating a hashcode refers to creating a new code based on information related to, associated with, or indicative of aspects of a corresponding operation. In an implementation, generating a hashcode refers to selecting a hashcode representative of aspects of the corresponding operation from a list of candidate codes. In an implementation, generating a hashcode refers to determining an appropriate or preferred code from a list of candidate codes based on one or more determination criteria, such as aspects of the corresponding operation weighted more heavily or considered more important. In an implementation generating a hashcode refers to calculating a new code based on some combination of pre-existing codes, for example, by concatenating two pre-existing codes or summing numerical values of the codes. Furthermore, implementations of the present disclosure may include multiples of the above-described implementations, noting, however, that the recitation of the above-described implementations is non-limiting and included to illustrate some manners in which the hashcode may be generated.

In an implementation, the hashcode is generated by using instructions (which may, for example, be included within or as part of the instrumentation routine) for translating the canonicalized operation data into a coded value. In an implementation, the hashcode may be a number value (e.g., an integer) or an alphanumeric value (e.g., a character string) generated based on the canonicalized operation data (e.g., the operation with any variable-specific values removed) and other identity operation data, such as the origin of the corresponding operation, which, in an implementation, may be indicative of a transaction initiating a sequence of operations of which the corresponding operation is a part. For example, a hashcode generated for a database query such as a SQL statement would be different from that of a server script, and a hashcode generated for a database query executed in relation to a first type of transaction would be different from that of the same database query executed in relation to a second type of transaction. In an implementation, the hashcode for canonicalized operation data is generated based on a set of rules relating to the corresponding operation. For example, the hashcode may be generated by querying attributes (e.g., variable data associated with the operation by a user or inherent based on the operation type) of the corresponding operation stored within a data structure, which may be maintained relative to the platform software.

In an implementation, the hashcode is a number generated based on the aforesaid stack trace, for example, based on a code established by the instrumentation routine, which may be used as the index for the associated time series data to be stored in the time series database. In an implementation, the hashcode is selected as or generated based on the stack trace for the operation, as taken from the stack of operations, and may be used to identify the location of an entry representing the operation within the stack of operations.

The following Table 1 shows hashcodes as numbers generated based on corresponding operation data:

TABLE 1

| Hashcode | Operation Origin | Canonicalized Operation Data |
| --- | --- | --- |
| 1559613 | Scheduler__Worker0 | SELECT storage alias FROM sys__storage |
| 6812129 | Policy__EventDelegator | UPDATE sys__status SET sys__updated__by |
| 2353347 | dB__Stats | DELETE FROM ts__c__4__6 |
| 4815259 | Scheduler__Worker1 | SELECT sys__document0.element FROM store |

The following Table 2 alternatively shows example hashcodes representative of stack traces generated for corresponding operation data:

TABLE 2

| Hashcode | Operation Origin | Canonicalized Operation Data |
| --- | --- | --- |
| glide.scheduler.worker.0.com. glide.db.selectstoragealiasfrom sys__storage | Scheduler__Worker0 | SELECT storage alias FROM sys__storage |
| glide.policy.eventdelegator. com.glide.db.updatesys__status setsys__updated__by | Policy__EventDelegator | UPDATE sys__status SET sys__updated__by |
| textIndex13.com.glide.db.stats .query.deletefromts__c__4__6 | dB__Stats | DELETE FROM ts__c__4__6 |
| glide.scheduler.worker.1.com. glide.db.selectsys__document0. elementfromstiore | Scheduler__Worker1 | SELECT sys__document0.element FROM store |

At step 1008, the canonicalized operation data is aggregated. In an implementation, the canonicalized operation data is aggregated based on the hashcode generated in step 1006. In an implementation, the canonicalized operation data is aggregated based on one or more of the start time at which the subject operation began executing, the canonicalized operation data, and the origin of the corresponding operation.

In an implementation, aggregating the canonicalized operation data first requires that it be determined whether any operation data corresponding to the same identity operation data (e.g., the operation name and origin of the operation) is already stored in the time series database, for example, by the instrumentation routine sending a query to the time series database. In an implementation, this is done by identifying a hashcode associated with the canonicalized operation data and determining whether the hashcode is already associated with any entries in the time series database. This could also be done by searching the time series database for the specific identity operation data corresponding with the canonicalized operation data to be aggregated.

If it is determined that operation data corresponding to the same identity operation data is already stored in the time series database, the instrumentation routine may update one or more of the performance operation data values associated with the respective entry (e.g., total execution time, average execution time, and execution counter) based on the canonicalized operation data. In an implementation, updating such performance operation data is done by combining the performance operation data values for the canonicalized operation data to be aggregated with corresponding values of the identified stored operation data, as applicable, such as by adding the respective values of the canonicalized operation data and stored operation data or by incrementing values of the stored operation data based on the corresponding values of the canonicalized operation data. If it is determined that no time series data corresponding with the identity operation data of the canonicalized operation data is stored within the time series database, the performance operation data values of the canonicalized operation data are stored as new time series data entries in the time series database. In an implementation, determining whether identity operation data corresponding with the canonicalized operation data is already stored in the time series database is done by determining whether the hashcode associated with the canonicalized operation data is associated with any entries in the time series database.

At step 1010, the aggregated operation data is stored in the time series database for the execution time interval specified by the intercepted operation data and based on the execution start time of the operation. For example, the aggregated operation data may be stored in the time series database in a table including fields for the various aggregated operation data values. In an implementation, the canonicalized operation data, prior to aggregation, is stored within a cache including, for example, a temporary table for ease in combining the values with previously-stored aggregated operation data associated with the same hashcode. The cache may store the canonicalized operation data in a manner similar or identical to how it may eventually be stored in the time series database, for example, by storing aspects of the canonicalized operation data within the same data fields as the aggregated operation data is stored in the time series database. This may facilitate an easy transfer of data from the cache to the time series database.

In an implementation, a step of determining whether to store canonicalized operation data in the cache is made based on one or more thresholds. For example, a first threshold may be used to determine whether the total execution time for the canonicalized operation data is above a predetermined value, which may differ based on the corresponding operation type. This may be helpful in determining which canonicalized operation data is important enough to be aggregated for performance metric evaluation. A second threshold may be used to determine whether the cache is storing more data than another predetermined value, which, upon being reached, may result in the data stored within the cache being transferring to the time series database and the cache memory being cleared. If the second threshold indicates that the cache is full, for example, a decision may also be made not to store new canonicalized operation data in the cache until its memory is cleared. In an implementation, all canonicalized operation data is transferred to the cache before it is stored in the time series database. In an implementation, some or none of the canonicalized operation data is transferred to the cache before it is stored in the time series database. In an implementation, canonicalized operation data transferred to the cache is aggregated, as applicable, before it is stored in the time series database.

In an implementation, where there is no time series data stored in the database corresponding to the identity operation data of the canonicalized operation data to be aggregated at step 1008 (e.g., where the hashcode associated with such canonicalized operation data is not associated with any data then stored in the time series database), the step of aggregating the canonicalized operation data 1008 may either be skipped or combined with the step of storing the data in the time series database 1010. In an implementation, storing new time series data entries in the time series database includes associating the entry, once stored or during a storing process, with the hashcode generated with respect to the entry data, which may be used, for example, to index the new entry and/or to reference the new entry upon aggregating subsequent canonicalized operation data associated with the same hashcode.

In that the identification or execution of a transaction may initiate a sequence of operations necessitating the execution of multiple other operations, in an implementation, the instrumentation routine may be configured to intercept new operation data from the platform software immediately upon storing the newly aggregated operation data pertaining to the operation data then-most recently intercepted from the platform software. Alternatively, in an implementation, the instrumentation routine may continuously seek to intercept new sets of operation data (e.g., by intercepting operations of a sequence of operations) from the platform software as soon as a first set of operation data is intercepted. For example, the instrumentation routine may, upon intercepting operation data for a given transaction, immediately listen to the platform software for operation data pertaining to a next operation of a sequence of operations initiated by the transaction, in which case it may continue processing various steps of method 1000 for each of the sets of operation data contemporaneously.

Method 1000 and the platform software may include further functionality beyond what is described above. In an implementation, at step 1012, the instrumentation routine communicates data indicative of a graphical representation of the stored operation data to the platform software, and the platform software outputs same to a display, such as the display of a user computer. For example, the graphical representation may include the table of FIG. 8 and/or the bar graph of FIG. 9. The graphical representations may further or instead include other types of visual depictions of data to help a user to identify trends in performance metrics with respect to operations executed by the platform software for the user-configured program. The graphical representations may display stored operations according to their execution time interval, identity operation data, and/or other operation-specific data, such as the origin of the operation or the sequence of operations to which given data pertains.

A user, such as a customer of an information technology service provider or developer of software programs, may use the present disclosure to granularly assess performance metrics of one or more operations executed in connection with user-configurable programs over discrete time intervals. Effectively, the present disclosure may be used to streamline the identification of root cause for runtime and performance issues, thus improving efficiency in determining runtime and related performance issues for a variety of cloud-based programs. In this way, customers, developers, and other users of the present disclosure may be able to independently resolve these issues expeditiously without needing to engage external support.

While the foregoing disclosure shows a number of illustrative embodiments, it will be apparent to those skilled in the art that various changes and modifications can be made herein without departing from the scope of the disclosure as defined by the appended claims. Accordingly, the disclosed embodiment are representative of the subject matter which is broadly contemplated by the present disclosure, and the scope of the present disclosure fully encompasses other embodiments which may become obvious to those skilled in the art, and that the scope of the present disclosure is accordingly to be limited by nothing other than the appended claims.

All structural and functional equivalents to the elements of the above-described embodiments that are known or later come to be known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same implementation unless described as such.

Furthermore, although elements of the disclosure may be described or claimed in the singular, reference to an element in the singular is not intended to mean "one and only one" unless explicitly so stated, but shall mean "one or more." Additionally, ordinarily skilled artisans will recognize in view of the present disclosure that while operational sequences must be set forth in some specific order for the purpose of explanation and claiming, the present disclosure contemplates various changes beyond such specific order.

In addition, those of ordinary skill in the relevant art will understand that information and signals may be represented using a variety of different technologies and techniques. For example, any data, instructions, commands, information, signals, bits, symbols, and chips referenced herein may be represented by voltages, currents, electromagnetic waves, magnetic fields or particles, optical fields or particles, other items, or a combination of the foregoing.

Moreover, ordinarily skilled artisans will appreciate that any illustrative logical blocks, modules, circuits, and process steps described herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The foregoing description describes only some examples of implementations of the described techniques. Other implementations are available. For example, the particular naming of the components, capitalization of terms, the attributes, data structures, or any other programming or structural aspect is not mandatory or significant, and the mechanisms that implement the systems and methods described herein or their features may have different names, formats, or protocols. Further, the system may be implemented via a combination of hardware and software, as described, or entirely in hardware elements. Also, the particular division of functionality between the various system components described herein is merely by example, and not mandatory; functions performed by a single system component may instead be performed by multiple components, and functions performed by multiple components may instead performed by a single component.

It is to be understood that the present disclosure is not to be limited to the disclosed implementations but, on the contrary, is intended to cover various modifications and equivalent arrangements included within the scope of the appended claims.

What is claimed is:

1. A cloud computing system, comprising:
    a processor; and
    a memory, accessible by the processor, the memory storing instructions, that when executed by the processor, cause the processor to perform operations comprising:
        receiving operation data associated with an operation of a user-configured program, the operation data comprising a start time and an origin of the operation;
        canonicalizing the operation data into one or more canonicalized representations of the operation data associated with respective executions of the operation by the user-configured program by removing operation-specific variable data to generate stripped operation data for the operation, wherein the operation-specific variable data comprises data associated with one or more parameters from a first execution of the operation and additional data associated with the one or more parameters from a second execution of the operation, wherein the data associated with the first execution of the operation is different from the additional data associated with the second execution of the operation;
        creating aggregated operation data based on the stripped operation data, wherein the stripped operation data comprises the start time and the origin; and
        identifying a root cause of a performance issue associated with the user-configured program based on the aggregated operation data.

2. The cloud computing system of claim 1, wherein identifying the root cause of the performance issue comprises identifying one or more operations of the user-configured program that contributed to a slower performance of one or more transactions associated with the user-configured program.

3. The cloud computing system of claim 1, wherein the origin of the operation is indicative of one or more additional operations that directly call the operation or result in execution of the operation.

4. The cloud computing system of claim 1, wherein creating the aggregated operation data comprises generating a hashcode representative of the stripped operation data for the operation and creating the aggregated operation data based on the start time, the stripped operation data, the origin, and the hashcode.

5. The cloud computing system of claim 1, wherein the operation data comprises an execution time interval, and the operations comprise storing the aggregated operation data in a database based on the start time and the execution time interval.

6. The cloud computing system of claim 1, wherein the operations comprise transmitting a graphical representation of one or more performance metrics associated with each operation of the user-configured program to a user device for display.

7. The cloud computing system of claim 6, wherein the graphical representation comprises an origin of each operation of the user-configured program, an execution time interval of each operation of the user-configured program, or an execution sequence of each operation of the user-configured program, or a combination thereof.

8. A method, comprising:
receiving operation data associated with an operation of a user-configured program, the operation data comprising a start time, an execution time interval, and an origin of the operation indicative of one or more additional operations that directly call the operation or result in execution of the operation;
canonicalizing the operation data into one or more canonicalized representations of the operation data associated with respective executions of the operation by the user-configured program by removing operation-specific variable data to generate stripped operation data for the operation, wherein the operation-specific variable data comprises data associated with one or more parameters from a first execution of the operation and additional data associated with the one or more parameters from a second execution of the operation, wherein the data associated with the first execution of the operation is different from the additional data associated with the second execution of the operation;
creating aggregated operation data based on the stripped operation data, wherein the stripped operation data comprises the start time and the origin; and
identifying a root cause of a performance issue associated with the operation based on the aggregated operation data.

9. The method of claim 8, wherein identifying the root cause of the performance issue comprises identifying one or more operations of the user-configured program that contributed to a slower performance of one or more transactions associated with the user-configured program.

10. The method of claim 8, wherein creating the aggregated operation data comprises generating a hashcode representative of the stripped operation data for the operation and creating the aggregated operation data based on the start time, the stripped operation data, the origin, and the hashcode.

11. The method of claim 8, comprising transmitting a graphical representation of one or more performance metrics associated with each operation of the user-configured program to a user device for display.

12. The method of claim 11, wherein the graphical representation comprises an origin of each operation of the user-configured program, an execution time interval of each operation of the user-configured program, or an execution sequence of each operation of the user-configured program, or a combination thereof.

13. The method of claim 8, wherein the operation-specific variable data comprises a portion of the operation data associated with the respective executions of the operation.

14. A non-transitory, computer-readable medium, comprising instructions that when executed by one or more processors, cause the one or more processors to perform operations comprising:
receiving operation data associated with an operation of a user-configured program, the operation data comprising a start time, an execution time interval, and an origin of the operation;
canonicalizing the operation data into one or more canonicalized representations of the operation data associated with respective executions of the operation by the user-configured program by removing operation-specific variable data to generate stripped operation data for the operation, wherein the operation-specific variable data comprises data associated with one or more parameters from a first execution of the operation and additional data associated with the one or more parameters from a second execution of the operation, wherein the data associated with the first execution of the operation is different from the additional data associated with the second execution of the operation;
creating aggregated operation data based on the stripped operation data, wherein the stripped operation data comprises the start time and the origin; and
identifying a root cause of a performance issue associated with the operation based on the aggregated operation data.

15. The non-transitory, computer-readable medium of claim 14, wherein identifying the root cause of the performance issue comprises identifying one or more operations of the user-configured program that contributed to a slower performance of one or more transactions associated with the user-configured program.

16. The non-transitory, computer-readable medium of claim 14, wherein creating the aggregated operation data comprises generating a hashcode representative of the stripped operation data for the operation and creating the aggregated operation data based on the start time, the stripped operation data, the origin, and the hashcode.

17. The non-transitory, computer-readable medium of claim 14, wherein the operation data comprises an execution time interval, and the operations comprise storing the aggregated operation data in a database based on the start time and the execution time interval.

18. The non-transitory, computer-readable medium of claim 14, wherein the operations comprise transmitting a graphical representation of one or more performance metrics associated with each operation of the user-configured program to a user device for display.

19. The non-transitory, computer-readable medium of claim 18, wherein the graphical representation comprises an origin of each operation of the user-configured program, an execution time interval of each operation of the user-configured program, or an execution sequence of each operation of the user-configured program, or a combination thereof.

20. The non-transitory, computer-readable medium of claim 14, wherein the operation-specific variable data comprises a portion of the operation data associated with the respective executions of the operation.

\* \* \* \* \*